Jan. 13, 1970 J. STENCEL, JR., ET AL 3,488,838

METHOD OF MAKING MAGNETIC TRANSDUCERS

Filed June 21, 1967 2 Sheets-Sheet 1

INVENTORS.
JOHN STENCEL, JR.
JOHN E. HYLAN.
HOWARD. P. WHITE.
GEORGE E. DOBSON.
WESLEY R. WOLTER.

BY

ATTORNEY.

METHOD OF MAKING MAGNETIC TRANSDUCERS

Filed June 21, 1967 2 Sheets-Sheet 2

INVENTORS.
JOHN STENCEL, JR.
JOHN E. HYLAN.
HOWARD P. WHITE.
GEORGE E. DOBSON.
WESLEY R. WOLTER.
BY
Kevin R. Peterson
ATTORNEY.

3,488,838

METHOD OF MAKING MAGNETIC TRANSDUCERS

John Stencel, Jr., Bloomfield Hills, John E. Hylan, Birmingham, Howard P. White, Livonia, George E. Dobson, Detroit, and Wesley R. Wolter, Lathrup Village, Mich., assignors to Burroughs Corporation, Detroit, Mich., a corporation of Michigan Filed June 21, 1967, Ser. No. 647,727
Int. Cl. H01f *7/06;* G11b *5/42*
U.S. Cl. 29—603 5 Claims

ABSTRACT OF THE DISCLOSURE

An improved magnetic transducer having a ferrite element supported by a line of insulating material in a substantially free manner and a process for manufacturing the magnetic transducer.

SUMMARY OF THE INVENTION

The present invention relates to magnetic transducers and to a method for making magnetic transducers. More particularly, the present invention relates to magnetic read and write heads for use in digital computers.

In high speed data processing machines employing magnetic discs, it is essential to mount the magnetic transducer, i.e., the read and write heads, in close proximity to the moving disc. The latter requirement, however, presents two serious problems. First, since the transducer must be near the disc, the vibration caused by the motion of the disc places a strain upon the elements forming the transducer. Second, since the transducer must operate close to the disc, great care and precision must be exercised in both the manufacture of the transducer and the method of mounting the transducer.

In attempting to increase the durability of the transducers, various potting or encapsulating materials were tested. It was noted, however, that during the setting or curing of the encapsulating material, the ferrite element in the transducer often cracked or became fractured. The cracking of the ferrite element greatly reduced the sensitivity and reproducibility of the transducer. Furthermore, the setting of the plastic material within the supporting shell of the transducer released a large amount of heat in a confined area resulting in uncontrolled and unpredictable damage to the transducer. The total encapsulation of the ferrite element, whether cracked or not, was also found to decrease the sensitivity of the transducer.

It is, therefore, an object of the present invention to provide a magnetic transducer which does not suffer from the aforesaid disadvantages.

It is another object of the present invention to provide a durable and sensitive magnetic transducer in which the ferrite element is substantially free floating.

It is still another object of the present invention to provide a method for the manufacture of the improved magnetic transducers of the present invention.

BRIEF DESCRIPTION OF THE DRAWINGS

The invention, both as to its organization and method of operation, together with further objects and advantages thereof, will best be understood by reference to the following detailed description taken in connection with the accompanying drawings in which.

DETAILED DESCRIPTION OF THE INVENTION

Figures 1, 2, 3:
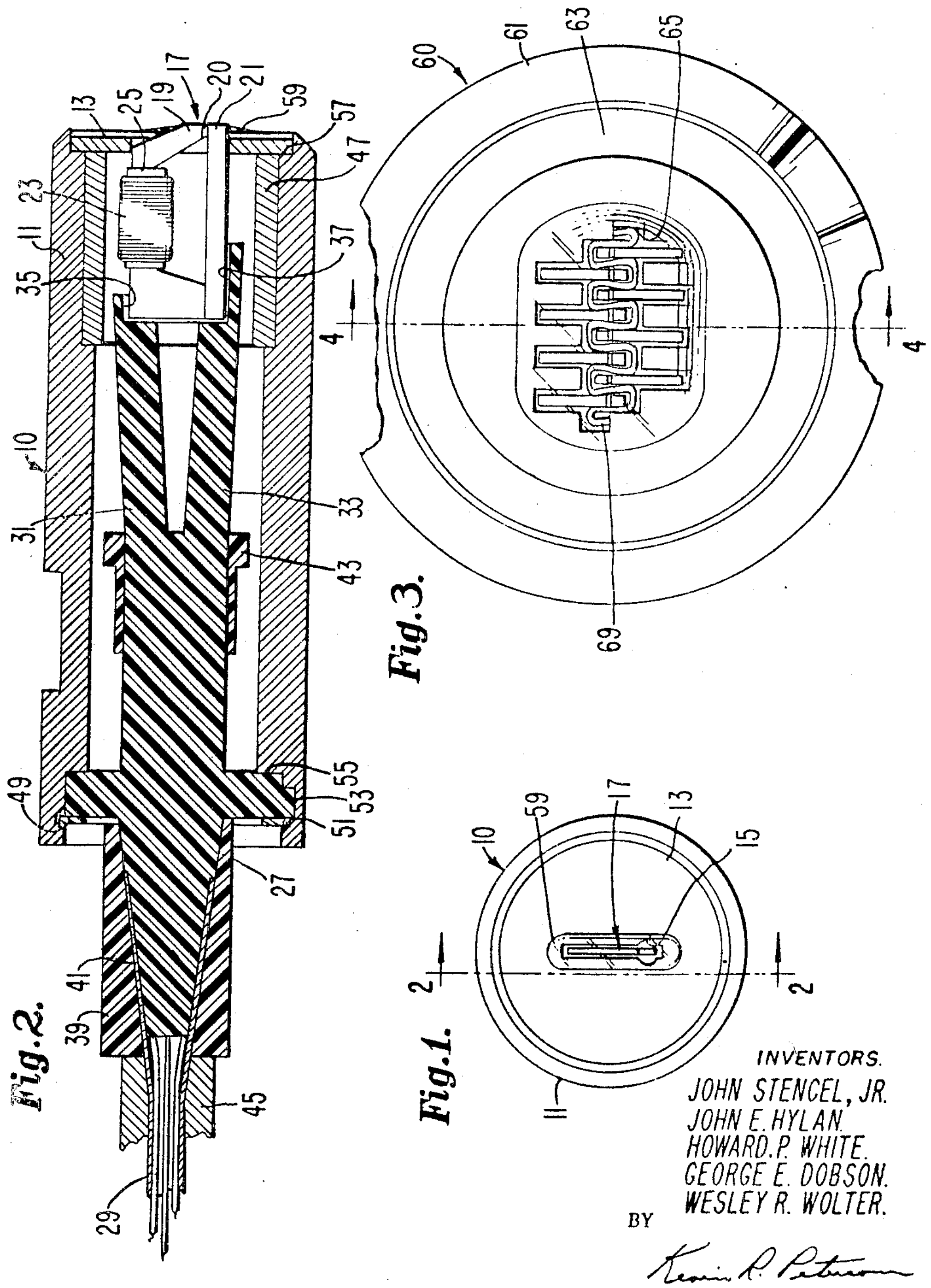
FIGURE 1 is an end elevational view of a single element transducer head of the present invention.
FIGURE 2 is a sectional view taken along the line 2—2 of FIG. 1.
FIGURE 3 is an end elevational view of a plural element transducer head of the present invention.

Referring now in detail to the drawings, and first to FIG. 1 and FIG. 2, a single element transducer head 10 is shown comprising a tubular supporting shell 11 which is closed at one end by an apertured closure member 13. The supporting shell 11 can be made of metal, for example, steel, aluminum, brass, etc. For our applications, a tube of cold rolled steel is preferred. The closure member 13 can also be made of the metals indicated; however, for extended use and durability, stainless steel is preferred.

At approximately the center of the disc 13 a key-slot type aperture 15 is provided. An aperture configuration of this type is preferred since it leaves sufficient room for the ferrite sensing element 17 to project without fear of being shorted out or grounded out by the disc.

The ferrite element 17 is made up of a C piece 19 and an I piece 21. The names for the several pieces of the ferrite element were derived from their structural configuration. A bifilar wound coil 23 is wound about the piece 19 and insulated therefrom by insulator 25. A bifilar coil is employed since the electrical resistance of each winding will be substantially the same.

As best shown in FIG. 2, an insulating guide member 27 is mounted within the tubular shell 11. The guide member 27 is used to hold the ferrite element 17 during the assembly of the transducer head and also to support and insulate the several electrical conductors 29 entering the transducer and connecting with the ferrite element 17. The guide member 27 can be made of any suitable plastic material having the necessary compatibility and coefficient of expansion. Methyl methacrylate has been found to be particularly suitable in the manufacture of the transducers of the present invention.

The guide member 27 has two thin elongated finger portions 31 and 33 which are used to hold the ferrite element during the assembly of the transducer. The fingers 31 and 33 are designed to place very little pressure on the ferrite element 17 so that it will not tend to be damaged during the assembly process. At the end of each of the elongated fingers are cut outs 35 and 37 which assist in gripping and aligning the ferrite.

The electrical conductors 29 are attached to the guide member 27 by a tapered collar 39 which clamps against the electrical shield 41 about the conductors. The individual conductors pass through separate channels, not shown, in the outer surface of the guide member 27 and are held in place by a plastic slip ring 43. The conductors 29 and shielding 41 are retained in place by a heat shrinkable plastic sleeve 45.

Within the tubular shell 11 and surrounding the ferrite element 17, there is mounted a ferrite shield 47. The ferrite shield serves to confine the magnetic field generated by the coil 23 during the writing process and also to protect the coil from any stray magnetic fields. The ferrite shield 47 is not essential to the operation of the transducer but is preferred for use in applications where potentially interfering magnetic fields might be present.

The guide member 27 is held within the shell 11 by means of a split ring 49 which locks in a shaped annular groove 51 near the open end of the tube. The split ring 49 expands against the sloping surface of the groove 51 and forces an integrally formed collar 53 on the guide member 27 into abutting relationship with a shoulder 55 on the inside of the shell 11.

Figures 4, 5:
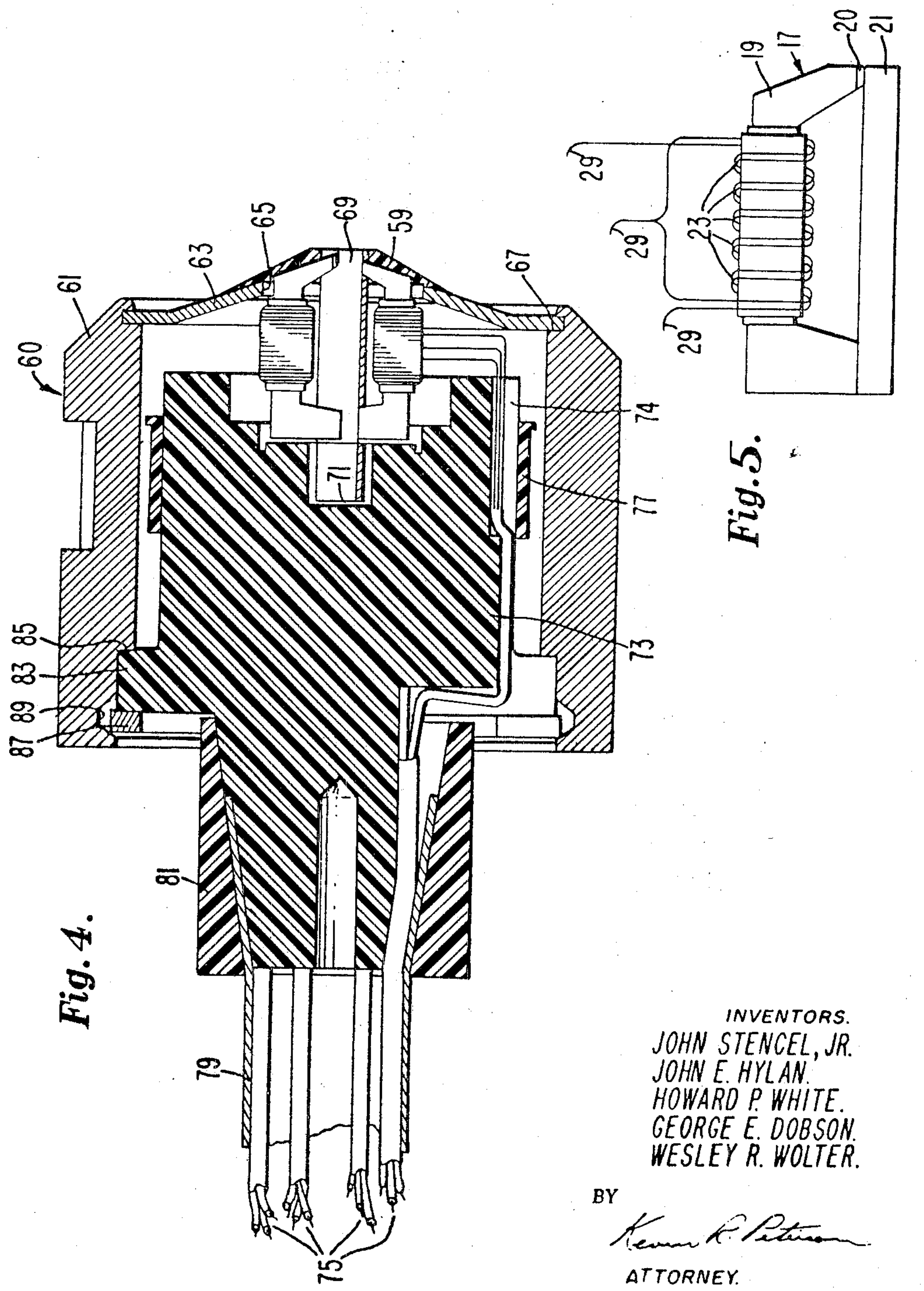
FIGURE 4 is a sectional view taken along the line 4—4 of FIG. 3.
FIGURE 5 is a diagrammatic view illustrating the bifilar winding used in the transducers of the present invention.

In the manufacture of the magnetic transducer heads, referring to FIGURE 5, the C piece 19 is mounted in a suitable fixture, not shown, insulated about the center portion and then wrapped with the bifilar coil 23. The C piece 19 and the I piece 21 are then bonded directly together at one end while a thin copper shim 20 is bonded between the pole pieces. The several pieces can be joined together with any suitable adhesive, for example, an epoxy glue. The copper shim provides a gap of approximately 0.0012 inch in the ferrite element.

After assembling the several pieces of the ferrite element, the ferrite is placed in the end of the guide member 27 where it is held by the elongated fingers 31 and 33. The leads from the coil 23 and the conductors 29 are then joined and held by the ring 43 which is slid over the connection to provide electrical insulation.

The closure member 13 and tube 11 are previously assembled by any suitable technique. In the present invention, it has been found convenient to place the disc 13 into the end of the tube 11 where it is supported on a shoulder 57. The small portion of the tube 11 projecting beyond the closure 13 is then rolled or turned under to securely grip the disc.

The assembled guide member 27 and ferrite element 17 are then placed into the tubular support 11 with the end of the ferrite projecting slightly through the aperture 15 in the closure 13. The ferrite is aligned in the disc so that the copper shim is in the larger portion of the key-slot aperture. The ring 49 is then snapped in place in the recess 51 to hold the entire assembly together.

After the several pieces forming the transducer are assembled, the alignment of the ferrite element 17 should be checked. The guide member 27 tends to maintain the pieces in alignment, however, it is best to inspect the assembled transducer before proceeding further. If necessary, the ferrite element 17 can be aligned in the aperture 15 with a small knife blade-like tool.

Following inspection of the transducer, a small amount of an epoxy-type resin 59 should be applied over the end of the ferrite element 17 and the surrounding portion of the closure 13. An epoxy resin sold by Emerson Cuming Inc. of Canton, Mass., and identified as Stycast 2651 MM yellow is representative of the type of resin that can be employed. The epoxy should be in a fairly viscous condition before application to the transducer to preclude the flowing of excess material into the tubular shell. The epoxy should be applied so that only the exposed portion of the ferrite element 17 is coated. It has been observed that the epoxy that flows through the aperture in the disc tends to adhere to the inner surface of the disc rather than flowing along the ferrite into the coil. The flare out of the epoxy material tends to strengthen the bond between the ferrite and the cap.

The epoxy should be allowed to set at room temperature until it reaches the state where it can be dimpled by the point of a pencil or a toothpick. In this condition the epoxy is self supporting but is still capable of being deformed by slight pressure. After the epoxy has reached this state, the entire transducer assembly should be placed into an oven for approximately one hour at 212° F.

When the guide element 27 is heated, the plastic expands and pushes the ferrite element 17 outward through the aperture 15 into the partially cured epoxy 59. The epoxy will harden and firmly grip the element during the high temperature cure. At the end of the heating period, the transducer should be removed from the oven and be allowed to air cool for approximately 12 hours. During the cooling period, the plastic guide member 27 will contract and draw away from the ferrite 17 leaving the ferrite suspended in the cured epoxy 59. The ferrite will then be substantially free floating being held by the thin layer of epoxy surrounding the exposed portion of the ferrite. The epoxy should wet the ferrite element and the closure member to form an airtight seal so that dirt will not tend to be drawn through the transducer to the disc where it could damage the face of the disc and the transducer element.

When the epoxy material is applied to the end of the transducer, the ferrite element may be covered. It is necessary, therefore, to remove the excess epoxy from the face of the head before the transducer is ready for use. The face of the transducer should be carefully machine lapped or ground to expose the ferrite and to shape the leading and trailing edges of the ferrite and epoxy. The transducer is now ready for assembly into a memory unit.

In the discussion presented above, a transducer having only a single ferrite element was described. The structure and method of the present invention is also adaptable to the construction of a plural ferrite element read and write head, as shown in FIGURES 3 and 4.

Referring to FIGS. 3 and 4, an eight ferrite element transducer, indicated generally by the numeral 60, is shown having a hollow tubular barrel 61 which is closed at one end by a closure member 63 having an aperture 65 therein. The transducer 60 can be employed to simultaneously read or write from eight separate tracks on a magnetic storage disc or drum.

The barrel 61 is preferably made of cold rolled steel while the closure 63 is made of stainless steel. The cap is joined to the barrel by inserting it into the end of the barrel and resting it on the annular shoulder 67. The edge of the barrel projecting beyond the cap 63 can then be spun or rolled to lock the cap in place.

After the cap and barrel are mechanically joined, the outer and inner surfaces of the assembly should be coated. The outer surface is preferably chrome plated to protect against corrosion and the possible flaking off of rust which would have a disastrous effect on both the head and disc at the close tolerances at which they are operating. The inner surface of the assembly should be coated with an electrically insulating material to protect the head from being shorted or grounded out during use and to also round out any sharp edges which might remain after the mechanical operations are completed. Any of the numerous liquid electrical insulating materials which are capable of forming a stable coating within the metal shell are suitable, for example, PT-207 sold by Product Techniques Inc. of Downey, California. The latter material forms a rugged coating with an insulating ability of 500 volts per 0.001 inch and is not affected by the curing temperature used in processing the heads.

The closure 63 is of a circular convex configuration and has a substantially flat area across the center where the aperture 65 is located. The closure 63 can be quickly and inexpensively prepared by stamping from sheet stainless steel. The aperture 65 is designed so that eight oppositely oriented ferrite elements can be projected therethrough.

The assembly of the plural ferrite element transducer follows substantially the same procedure as the single element unit. The only essential divergence is in the use of a web 69 to grip the eight ferrite elements so they can be handled as a unit. The web 69 is made from a piece of half-hard brass approximately 0.008 inch thick. The piece of brass is folded back and forth in order to form eight recessed portions where the ferrite elements can be held and supported. At each end of the web, there is a flexure, not shown, used to bias the web and ferrites away from the inner surface of the cap 63.

In assembling the transducer 60, the ferrite C and I pieces are assembled with their respective coils and copper shims. The assembled ferrites are then placed in the recesses in the web 69 with the coils on adjacent ferrites being oppositely disposed. The latter orientation of the coils not only provides a more compact unit but also tends to eliminate cross talk between adjacent ferrites.

The web 69 with its assembled ferrite elements is then slipped into a recess 71 in the front of guide member 73. The guide member 73 is essentially the same as the guide member used in the single element ferrite heads and is preferably made of methyl methacrylate. The guide member 73 has a plurality of longitudinal channels 74 along its outer surface which are used to guide and separate the conductors which are connected to the ferrites. Each ferrite has three wires connected to it so there are twenty-four wires in the eight-element head.

After the web 69 and the ferrites are joined to the guide member 73, the several electrical conductors 75 are joined to the wire leads on the ferrites. The connected wires are then pushed into the channels 74 along the outer surface of the guide member 73, and a methyl methacrylate ring 77 is slipped over the connections to insulate them from the barrel 61. The ring 77 can be held in place by any suitable cement, for example, an epoxy cement.

The outer electrical shielding 79 about the conductors 75 is attached to the guide member 73 by a plastic piece 81 which can be held in place by the same type of cement used to join ring 77 to guide member 73.

Upon completion of the electrical assembly, the guide member 73 and associated ferrites are slipped into the barrel 61. The ferrites are aligned with the aperture 65 in the closure 63 and are pushed through until they project a small distance. The guide member 73 has an integral shoulder portion 83 which is brought into abutting relationship with an annular shoulder 85 formed within the barrel 61. A snap ring 87 is then inserted into shaped annular groove 89 where, in expanding against the sloping surface of the groove, it exerts pressure on the guide member 73 holding it in place.

The completely assembled transducer is now supported in a suitable fixture with the ferrites projecting upwardly. The same plastic material as used with the single ferrite head is used with the plural head. In applying the plastic to the head, the center of the head should be coated first. After the resin has set for a few minutes, the center and adjoining areas should be covered. Care must be taken in the application of the plastic to prevent the material from seeping into the head. If too much material is admitted to the head, the ferrite elements will be subject to cracking and fracture during the curing process.

Following the coating process, the head should be allowed to cure at room temperature until the epoxy reaches the state where it can be dimpled by a sharp instrument, such as a toothpick. The transducer should then be placed in a heated oven, 212° F., and cured for one hour. During the one hour high temperature cure the plastic guide member 73 will expand and force the ferrites and web outward into the partially cured epoxy material. The epoxy will then harden while standing at the high temperature and form a firm bond to the ferrites and web.

After the one hour cure at 212° F., the transducer should be removed from the oven and be allowed to cool for several hours. If possible, it is preferred to plan the assembly procedure so that the transducer can be allowed to cool overnight. During the cooling process, the plastic guide member will contract away from the web and ferrites, which are now firmly attached to the cap 63 by a thin film of epoxy 91, having the ferrites in a substantially free floating condition.

The plural ferrite element transducer head is finished in essentially the same manner as the single element unit. The epoxy coating the ferrites should be ground or lapped off, and the leading and trailing edges of the epoxy and ferrites should be shaped to the preferred angle for use with a particular disc or drum.

It will be apparent that many changes and modifications of the several features described herein may be made without departing from the spirit and scope of the invention. It is therefore apparent that the foregoing description is by way of illustration of the invention rather than limitation of the invention.

While there has been described what are at present considered to be the preferred embodiments of the invention, it will be understood that various modifications may be made therein which are within the true spirit and scope of the invention as defined in the appended claims.

We claim:

1. A method of making a method comprising the following steps:

(a) providing a hollow supporting shell,
(b) closing one end of said shell with an apertured closure member,
(c) providing an electrically insulating guide member,
(d) assembling a ferrite element and its associated electrical conductors on said guide member,
(e) inserting said guide member and ferrite into said supporting shell so that the ferrite projects through the aperture in said closure member,
(f) coating the exposed portion of said ferrite and surrounding portion of said apertured closure member with a curable electrically insulating plastic,
(g) partially curing said plastic until it becomes self supporting,
(h) heating the assembled transducer to cause said guide member to expand and force said ferrite element forward into said plastic which becomes cured,
(i) cooling the transducer assembly to cause said guide member to contract away from said ferrite element leaving the element supported in a substantially free manner by the cured plastic,
(j) finishing the face of the transducer to expose said ferrite and shape the supporting plastic.

2. A method as set forth in claim 1 wherein said curable electrically insulating plastic is an epoxy plastic.

3. A method as set forth in claim 1 wherein said plastic is partially cured to the state where it can be dimpled by a pointed tool.

4. A method as set forth in claim 1 wherein the transducer is finished by lapping.

5. A method as set forth in claim 1 wherein said transducer is finished by grinding.

References Cited

UNITED STATES PATENTS 3,400,386 9/1968 Sinnott ---------- 179—100.2 X

JOHN F. CAMPBELL, Primary Examiner

CARL E. HALL, Assistant Examiner

U.S. Cl. X.R.

179—100.2

UNITED STATES PATENT OFFICE

CERTIFICATE OF CORRECTION

Patent No. 3,488,838 January 13, 1970

John Stencel, Jr., et al.

It is certified that error appears in the above identified patent and that said Letters Patent are hereby corrected as shown below:

Column 6, line 17, "method", second occurrence, should read -- magnetic transducer --.

Signed and sealed this 28th day of July 1970.

(SEAL)
Attest:

Edward M. Fletcher, Jr.
Attesting Officer

WILLIAM E. SCHUYLER, JR.
Commissioner of Patents